(12) United States Patent
Hugot et al.

(10) Patent No.: US 8,876,306 B2
(45) Date of Patent: Nov. 4, 2014

(54) MIRROR COMPRISING MECHANICAL MEANS FOR GENERATING PRIMARY GEOMETRICAL ABERRATIONS

(75) Inventors: Emmanuel Hugot, Marseilles (FR); Marie Laslandes, Marseilles (FR); Marc Ferrari, Marseilles (FR); Arnaud Liotard, Grasse (FR)

(73) Assignees: Thales, Neuilly sur Seine (FR); Centre National de la Recherche Scientifique, Paris (FR); Centre National d'Etudes Spatiales CNES, Paris (FR); Universite d'Aix Marseille, Marseilles (FR)

( * ) Notice: Subject to any disclaimer, the term of this patent is extended or adjusted under 35 U.S.C. 154(b) by 119 days.

(21) Appl. No.: 13/619,373

(22) Filed: Sep. 14, 2012

(65) Prior Publication Data

US 2013/0070355 A1    Mar. 21, 2013

(30) Foreign Application Priority Data

Sep. 16, 2011   (FR) ...................... 11 02805

(51) Int. Cl.
  *G02B 5/08*   (2006.01)
  *G02B 7/182*  (2006.01)
  *G02B 26/08*  (2006.01)
  *G02B 26/06*  (2006.01)

(52) U.S. Cl.
  CPC ............ *G02B 26/0825* (2013.01); *G02B 26/06* (2013.01)
  USPC ............................ 359/849; 359/871; 359/872

(58) Field of Classification Search
  None
  See application file for complete search history.

(56) References Cited

U.S. PATENT DOCUMENTS

| | | | |
|---|---|---|---|
| 4,043,644 A | 8/1977 | Humphrey | |
| 6,425,671 B1 | 7/2002 | Adler et al. | |
| 6,467,915 B2 | 10/2002 | Bar et al. | |
| 7,229,178 B1 | 6/2007 | Headley et al. | |
| 7,295,331 B2* | 11/2007 | Petasch et al. | 359/846 |
| 7,374,302 B2* | 5/2008 | Griffith et al. | 359/849 |
| 2009/0046348 A1* | 2/2009 | Sahm et al. | 359/290 |

FOREIGN PATENT DOCUMENTS

WO   01/81976 A2   11/2001

OTHER PUBLICATIONS

Hugot, E. et al., "Active Optics: stress polishing of toric mirrors for the VLT SPHERE adaptive optics system," Applied Optics, vol. 48, No. 15, pp. 2932-2941 (2009).
Emmanuel Hugot, et al, "Active Optics: Single Actuator Principle and Angular Thickness Distribution for Astigmatism Compensation by Elasticity", Applied Optics, Apr. 1, 2008, pp.. 1401-1409, vol. 47, No. 10, Optical Society of America.

* cited by examiner

*Primary Examiner* — Jade R Chwasz
(74) *Attorney, Agent, or Firm* — Baker & Hostetler LLP

(57) ABSTRACT

Optical devices can comprise a deformable mirror and a system for deforming said mirror. A deformation system comprises a first mechanical structure comprising a first surround, one or more electromechanical actuators attached to the first mechanical structure, a second mechanical structure comprising a substantially planar bottom and a second surround, both deformable, the bottom being attached to the first surround, the second surround being attached to the surround of the mirror, a rigid stud being attached to the bottom, substantially planar and centerd on the bottom, the electromechanical actuator or actuators exerting predetermined forces or bending moments on the stud so as to generate a particular distribution of the bending moments on the surround of the mirror, deforming it according to a geometrical form representative or of one or more predetermined geometrical aberrations.

9 Claims, 4 Drawing Sheets

MIRROR COMPRISING MECHANICAL MEANS FOR GENERATING PRIMARY GEOMETRICAL ABERRATIONS

CROSS-REFERENCE TO RELATED APPLICATION

This application claims priority to foreign French patent application No. FR 1102805, filed on Sep. 16, 2011, the disclosure of which is incorporated by reference in its entirety.

FIELD OF THE INVENTION

The field of the invention is that of deformable mirrors and more specifically mirrors whose reflecting surface is a paraboloid portion.

BACKGROUND

In optics, the production of aspherical surfaces entails implementing production means that are much more complex than the production of simple spherical surfaces. This production is all the more difficult if the surface is not of revolution. Now, in a large number of applications, and in particular in the field of instrumentation for astronomy, the optical combinations with mirrors require such surfaces. These are generally off-axis parabolic surfaces. Once the surface is produced, it is no longer possible to modify its form.

It is, these days, known practice to produce surfaces that can be deformed in a programmed manner. These systems are used notably to produce adaptive surfaces. To produce such a system, a set of actuators is arranged under the surface of the mirror to be deformed, which actuators act on the surface according to an analysis of a reference wave front until the desired surface is obtained. It will be understood that this technique requires complex analysis means and a large number of actuators.

SUMMARY OF THE INVENTION

The system according to the invention does not have these drawbacks. It operates according to another principle. It is known that, when a reflecting optical surface does not correspond to the ideal surface, a light beam reflected by this surface will exhibit geometrical aberrations. Now, it is possible to break down these geometrical aberrations into broad types of aberrations, each type corresponding to a simple geometrical deformation of the reflecting surface. These deformations can be generated by means of a small number of actuators shrewdly placed under the reflecting surface.

Thus, if the ideal surface is a portion of paraboloid and if the real surface is a portion of sphere, it is demonstrated that the paraboloid surface can be obtained from three types of aberrations which are a "focus" term, a "coma" term and an "astigmatism" term. It is then possible to deform the spherical surface by means of three simple deformations corresponding to these three aberrations, thus requiring a small number of actuators, one for each mode.

More specifically, the subject of the invention is an optical device comprising at least one deformable mirror and a system for deforming said mirror, said mirror of substantially circular form having a reflecting face and an opposite face comprising a surround attached to the deformation system, characterized in that the deformation system comprises at least: a first mechanical structure comprising at least one first surround; a first electromechanical actuator attached to the first mechanical structure; a second mechanical structure comprising a substantially planar bottom and a second surround, both deformable, the bottom being attached to the first surround, the second surround being attached to the surround of the mirror; a rigid stud attached to the bottom, substantially planar and centred on the bottom, the first electromechanical actuator exerting a predetermined force on the stud perpendicularly to the surface of said stud, so as to generate the uniform distribution of the bending moments on the surround of the mirror.

Advantageously, the system comprises a second electromechanical actuator, said second actuator being arranged so as to exert a predetermined bending moment on the stud parallel to the surface of said stud, so as to generate a distribution of the bending moments on the surround of the mirror modulated by a sine or cosine function.

Advantageously, the second actuator exerts a predetermined force on the stud parallel to the surface of said stud.

Advantageously, the first actuator and the second actuator are arranged so as to exert two predetermined forces on the stud perpendicularly to the surface of said stud, of the same intensity and of opposite directions, the points of application of the two forces being separated by a predetermined distance.

Advantageously, four actuators are arranged so as to exert four predetermined forces on the stud perpendicularly to the surface of said stud, of predetermined intensity, the points of application of the forces being separated by a predetermined distance.

Advantageously, the deformation system comprises a third structure comprising electromechanical means arranged so as to exert, at the ends of a first diameter of the surround of the mirror, two first predetermined forces perpendicularly to the reflecting face, of the same intensity and of the same direction.

Advantageously, the electromechanical means are arranged so as to exert, at the ends of a second diameter of the surround of the mirror orthogonal to the first diameter, two second predetermined forces perpendicularly to the reflecting face, of the same intensity and of opposite directions to the first predetermined forces.

Advantageously, the third structure comprises two deformable bars arranged orthogonally to one another and substantially parallel to the reflecting face, the first bar being attached to the surround of the mirror at the two ends of the first diameter and the second bar being attached to the surround of the mirror at the two ends of the second diameter, the electromechanical means being arranged so as to exert, at the intersection of the two bars, two opposing forces which tends to modify the distance which separates them in a dimension perpendicular to the reflecting face.

Advantageously, the reflecting face of the deformable mirror is planar or spherical or aspherical not taking into account any deformation.

The invention also relates to a method for producing a deformable mirror, characterized in that the production step of polishing said mirror is done on a tool comprising an optical device comprising the mirror and a system for deforming said mirror as defined above.

BRIEF DESCRIPTION OF THE DRAWINGS

The invention will be better understood and other advantages will become apparent on reading the following description, given as a nonlimiting example, and by virtue of the appended figures in which.

DETAILED DESCRIPTION

Figure 1:
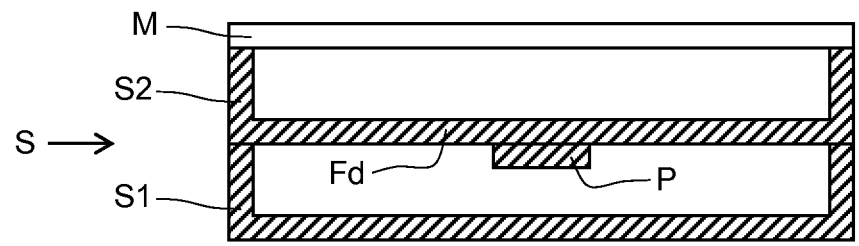
FIG. 1 represents a cross-sectional view of an optical device comprising a deformable mirror and a deformation system according to the invention, the actuators not being represented.

As a first nonlimiting example, FIG. 1 represents a view in cross section of an optical device comprising a deformable mirror M and a deformation system S according to the invention, the actuators not being represented.

The mirror M may be a plate of substantially circular or elliptical form. Its thickness can be constant as indicated in the different figures. The distribution of thickness can also follow a particular law so as to address mechanical or manufacturing behaviour stresses.

The mirror M comprises a reflecting front face suited to the radiation to be reflected and a rear face attached to the deformation system. This rear face comprises a surround for fixing to the deformation system. The form of this surround does not necessarily correspond to the general form of the mirror.

The deformation system S, in its basic version, essentially comprises two mechanical structures S1 and S2. In FIG. 1 and the subsequent figures, for reasons of simplicity, the mechanical parts are circular parts comprising flat bottoms of constant thickness and surrounds that are cylindrical of revolution and of constant height and thickness. Obviously, depending on the application, different forms can be envisaged in the context of this invention, typically non-cylindrical surrounds and radial and/or angular thickness variations.

A first mechanical structure S1 serves as support. It comprises a planar base and a first surround attached to that base. A second mechanical structure S2 serves as intermediate part between the support S1 and the mirror M. It comprises a substantially planar bottom Fd and a second surround, both deformable, the bottom being attached to the first surround, the second surround being attached to the surround of the mirror M.

A rigid stud P is attached to the bottom Fd. It is substantially planar and centred on the bottom.

The different mechanical parts S1, S2, P and M are linked together by the usual techniques employed in optical manufacturing. They can be glued, assembled by molecular adhesion or attached by any other adhesion means. It is also possible to machine a common mechanical assembly comprising a number of mechanical parts of the deformation system. Depending on the effect sought, the bonding may be continuous over the entire contact surface linking two mechanical parts or discontinuous, by studs or by bonding strips.

The deformation system also comprises one or more electromechanical actuators. As has been stated, the so-called third order geometrical aberrations each correspond to a simple geometrical deformation of the reflecting surface. More specifically, in a coordinate system based on cylindrical coordinates $(r, \theta, z)$, z being oriented along the optical axis of the mirror, it is possible to draw up the table I below of the deformations along the axis z, according to the aberration.

TABLE I

| TYPE OF ABERRATION | GEOMETRICAL CORRECTION |
| --- | --- |
| Focus | $z = r^2$ |
| Astigmatism | $z = r^2\cos(2\theta)$ or $z = r^2\sin(2\theta)$ |
| Coma | $z = r^3\cos(\theta)$ or $z = r^3\sin(\theta)$ |

Now, by imposing forces or bending moments with a certain distribution on the surround of the mirror, if its structure is sufficiently flexible to be deformed, the geometrical corrections sought are obtained.

Figure 2:
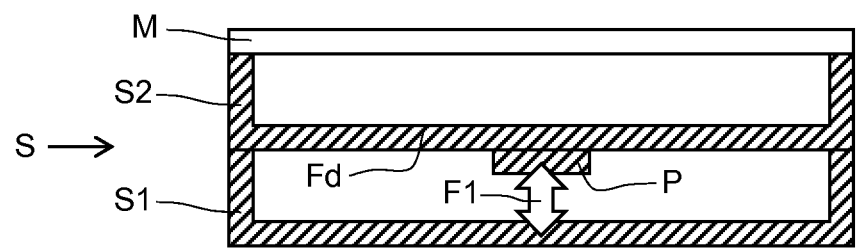
FIG. 2 represents the same view in cross section, the deformation system comprising an actuator exerting an axial deformation force, thus generating the "focus" mode.
Figure 6:
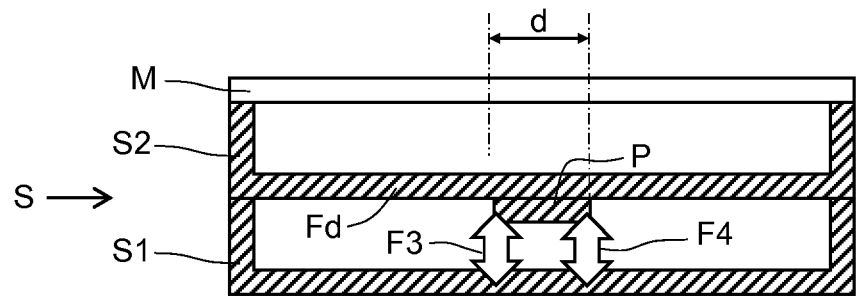
FIG. 6 represents the same view in cross section, the deformation system comprising two actuators exerting two differential axial deformation forces, thus generating a combination of the "focus" and "coma" modes.

Thus, in a first embodiment, if the aim is to correct or create a focus aberration, the deformation system comprises a first electromechanical actuator exerting a predetermined force on the stud perpendicularly to the surface of said stud, so as to generate a uniform distribution of the bending moments on the surround of the mirror. FIG. 2 shows, by a double white arrow, the position and the direction of the force F1 applied to the stud P. These bending moments will bring about the desired $r^2$ deformation of the surface of the mirror. An alternative with two actuators arranged on either side of the stud and applying one and the same force is represented in FIG. 6. The desired result is identical.

In a second embodiment, if the aim is to correct or create a coma aberration, the deformation system comprises a second electromechanical actuator, arranged so as to exert a predetermined bending moment on the stud parallel to the surface of said stud, so as to generate a distribution of the bending moments on the surround of the mirror modulated by the desired trigonometrical function.

To create this bending moment, three actuator configurations are possible as represented in FIGS. 3, 4, 5 and 6.

Figure 3:
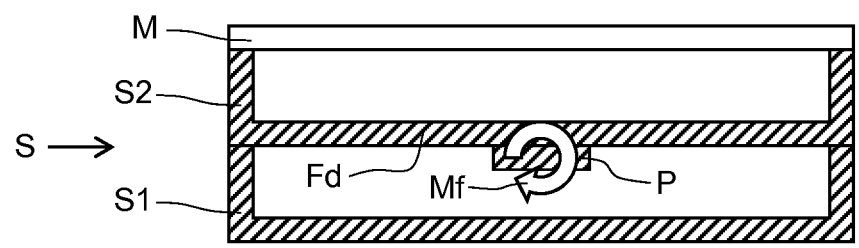
FIG. 3 represents the same view in cross section, the deformation system comprising an actuator exerting a lateral deforming bending moment, thus generating the "coma" mode.

In FIG. 3, the electromechanical actuator exerts a predetermined bending moment Mf on the stud P parallel to the surface of said stud. This moment is represented by a semicircular white arrow.

Figure 4:
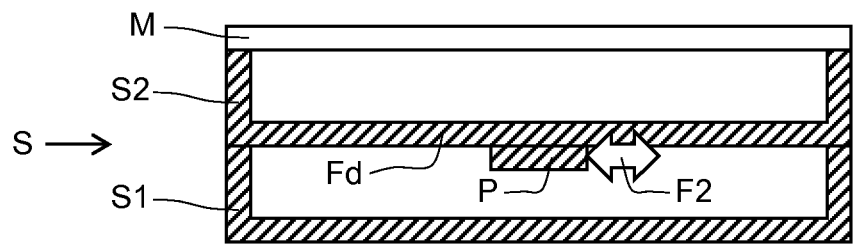
FIG. 4 represents the same view in cross section, the deformation system comprising an actuator exerting a lateral deformation force, thus generating the "coma" mode.

In FIG. 4, the electromechanical actuator exerts a predetermined force on the stud P parallel to the surface of said stud. This force is represented by a double white arrow F2.

Figure 5:
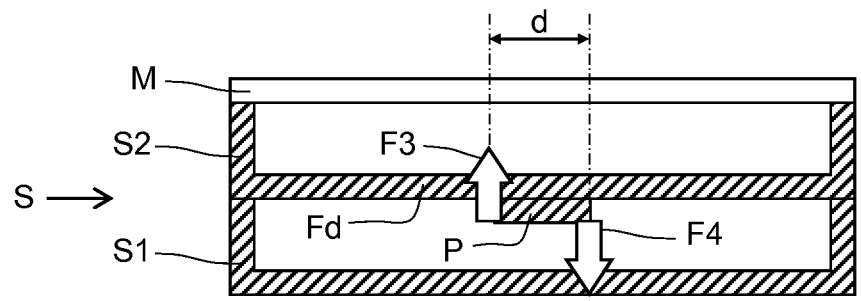
FIG. 5 represents the same view in cross section, the deformation system comprising two actuators exerting two axial and opposite deformation forces, thus generating the "coma" mode.

In FIG. 5, the deformation system comprises a first actuator and a second actuator that are arranged so as to exert two predetermined forces F3 and F4 on the stud perpendicularly to the surface of said stud, of the same intensity and of opposite directions, the points of application of the two forces being separated by a predetermined distance d as can be seen in this figure.

This last solution is elegant in as much as these same actuators can also be used to correct the focus aberration. It is then sufficient for the forces exerted to be in the same direction. Thus, it is possible to correct, by means of just two actuators, the focus aberrations and the coma aberrations simultaneously as illustrated in FIG. 6. In the case of FIG. 6, the forces applied are of the same intensity if the aim is to correct only the focus aberration and of different intensity if the aim is to simultaneously correct the focus and coma aberrations.

In the case of this second embodiment, if the aim is to correct or create an astigmatism aberration combined with the focus and coma aberrations, the deformation system comprises four electromechanical actuators, arranged in a square so as to generate a distribution of bending forces on the surround of the mirror modulated by the desired trigonometrical function.

Figure 7:
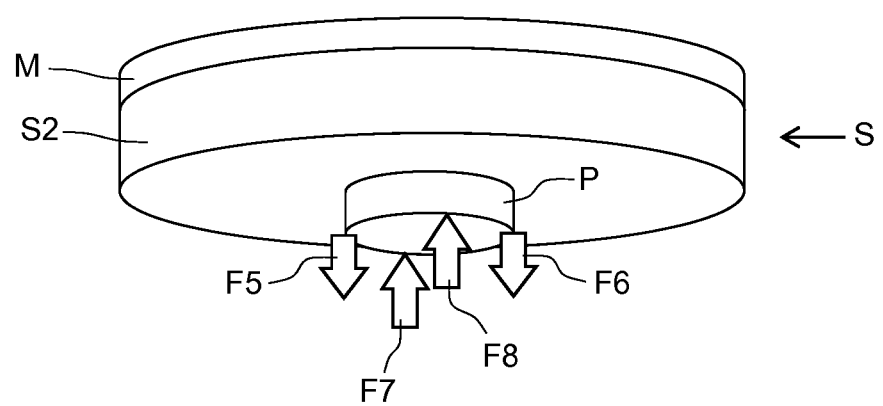
FIG. 7 represents a view in perspective of a deformation system comprising four actuators exerting four differential axial deformation forces, thus generating the combinations of focus, coma and astigmatism modes.

To create this flexing force, the actuators are arranged in the configuration represented in FIG. 7. In this FIG. 7, the deformation system comprises four actuators arranged so as to generate four forces F5, F6, F7 and F8 on the stud perpendicularly to the surface of said stud and of the same intensity. To generate astigmatism, the direction of the forces applied is identical for the actuators situated on one and the same diameter. Such is the case with the forces F5 and F6, for example. The opposite applies for the forces situated on different diameters. The points of application of the forces are separated by a predetermined distance D. This solution is elegant in as much as these same actuators can also be used to correct or generate the focus aberration. It is sufficient for all the forces exerted to be in the same direction. The coma aberrations can also be corrected or generated by applying two opposing forces on the opposing actuators and two zero forces in the perpendicular direction. This then gives the situation described in FIG. 5. Thus, it is possible to use just four actuators to correct the focus aberration, the two coma aberrations and the astigmatism aberration.

Finally, in a third embodiment, it is also possible to correct the astigmatism of the mirror, the coma and the focus using only three actuators. The astigmatism correction by means of actuators is known. Reference can be made to the publications by Emmanuel Hugot, by Gérard R. Lemaître and by Marc Ferrari on this subject. A first publication entitled "Active optics: single actuator principle and angular thickness distribution for astigmatism compensation by elasticity" published in Applied Optics 47, 1401-1409 (2008) and a second publication entitled "Stress polishing of toric mirrors for the VLT SPHERE adaptive optics system" published in Applied Optics 48, 2932-2941 (2009) will notably be cited.

To ensure this correction, the deformation system comprises a third structure S3 comprising electromechanical means arranged so as to exert, at the ends of a first diameter $\phi 1$ of the surround of the mirror, two first predetermined forces F9 and F10 perpendicularly to the reflecting face, of the same intensity and of the same direction.

Figure 8:
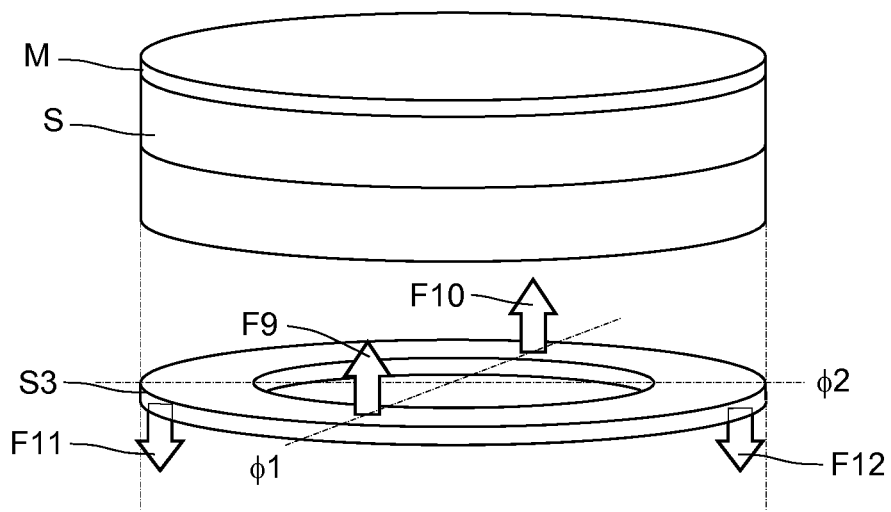
FIG. 8 represents a view in perspective of an optical device comprising a deformable mirror and a deformation system according to the invention comprising four actuators distributed on the surround of the mirror, thus generating the "astigmatism" mode.

In a first variant embodiment, it is possible, to this end, to use, as can be seen in the perspective view of FIG. 8, a deformation ring. This deformation ring can be arranged either under the first structure S1 as represented in FIG. 8, or between the first structure S1 and the second structure S2. As can be seen in FIG. 8, the electromechanical means can be arranged so as to exert, at the ends of a second diameter $\phi 2$ of the surround of the mirror orthogonal to the first diameter, two second predetermined forces F11 and F12 perpendicularly to the reflecting face, of the same intensity and of directions opposite to the first predetermined forces F9 and F10. The position of the forces can vary depending on the general arrangement of the optical device and the desired correction.

Figure 9:
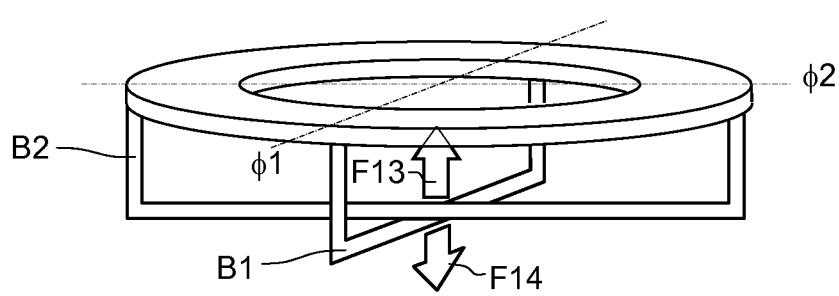
FIG. 9, finally, represents a view in perspective of a portion of a deformation system according to the invention comprising two orthogonal force-transmitting bars, thus generating the "astigmatism" mode.

In a second variant embodiment represented in FIG. 9, the third mechanical structure comprises two U-shaped deformable bars B1 and B2 arranged orthogonally to one another and substantially parallel to the reflecting face of the mirror, the first bar B1 being attached to the surround of the mirror at the two ends of the first diameter $\phi 1$ and the second bar B2 being attached to the surround of the mirror at the two ends of the second diameter $\phi 2$, the electromechanical means comprise a single actuator which exerts, at the intersection of the two bars, two opposing forces F13 and F14 which tend to modify the distance which separates them in a dimension perpendicular to the reflecting face of the mirror.

It is therefore possible, by means of a small number of actuators, to correct the three main types of aberrations. In a preferred configuration, three actuators are sufficient, the first and second for correcting the focus and coma aberrations as represented in FIGS. 5 and 6, the last dedicated to correcting the astigmatism as represented in FIG. 9.

Producing the different electromechanical actuators used in the devices according to the invention does not pose any particular problems. This type of actuator is already used in particular for the control of self-adaptive optical surfaces.

The calibration of the actuators, that is to say establishing the force or the moment to be applied to obtain the desired deformation, does not pose any problems for a person skilled in the art. It can be obtained by a simulation to compute the strength of the materials that make up the mechanical structure of the optical device. It can also be obtained by measuring, on an optical test bench, mechanical deformations of the structure or optical deformations of a reference wave front. These different measurement means are known to a person skilled in the art.

The device according to the invention can be used when the mirror is in operational use, either to introduce static deformations, unchanging in time, or to introduce dynamic variations, depending on parameters linked to the environment of the telescope such as atmospheric turbulences, changes of temperature or changes of optical configurations.

This device can also be used at the time of manufacture of the mirror and in particular in the polishing operations. A stress polishing is then performed, the deformation system applying predetermined stresses to the mirror during the polishing operations that are relaxed once the polishing is finished. Thus, it is possible to polish a simple form under stresses, planar or spherical for example, which becomes a naturally complex or aspherical form, once the stresses are released.

The device according to the invention can be used in a large number of applications. The following can notably be cited:
the generation of parabolas with variable off-axes used to produce syntheses of aperture, of large interferometers, diluted pupils, of pupil recombination, etc.;
the relaxation of the positioning stresses for large interferometers in formation flight;
active wave front correction for optical instruments;
the mass production of aspherical mirrors by stress polishing, for example, to produce the segments of the giant future terrestrial or space telescopes.

The fields of application of the invention are notably:
optical instrumentation for observing the earth and the universe;
laboratory optical instrumentation;
biomedical instrumentation;
instrumentation for laser applications.

The first advantage of the system according to the invention arises from the fact that a small number of actuators is used for the generation of the optical aberrations on the surface of the mirror. A single actuator is used for the generation of each of the modes.

The second advantage is that each of the deformation systems can be easily coupled, independently, allowing for the simple generation of the complex optical surfaces defined by the linear combinations of these said aberrations, corresponding to off-axis conicoidal portions.

The invention claimed is:

1. Optical device comprising at least one deformable mirror and a system for deforming said mirror, said mirror of substantially circular form having a reflecting face and an opposite face comprising a surround attached to the deformation system, wherein the deformation system comprises at least:
   - a first mechanical structure comprising at least one first surround;
   - a first electromechanical actuator attached to the first mechanical structure;
   - a second mechanical structure comprising a substantially planar bottom and a second surround, both deformable, the bottom being attached to the first surround, the second surround being attached to the surround of the mirror;
   - a rigid stud attached to the bottom, substantially planar and centered on the bottom, the first electromechanical actuator exerting a predetermined force on the stud perpendicularly to the surface of said stud, so as to generate a uniform distribution of bending moments on the surround of the mirror; and
   - a second electromechanical actuator, said second actuator being arranged so as to exert a predetermined bending moment on the stud parallel to the surface of said stud, so as to generate a distribution of the bending moments on the surround of the mirror modulated by a sine or a cosine function.

2. Optical device comprising at least one deformable mirror and a system for deforming said mirror according to claim 1, wherein the second actuator exerts a predetermined force on the stud parallel to the surface of said stud.

3. Optical device comprising at least one deformable mirror and a system for deforming said mirror according to claim 1, wherein the first actuator and the second actuator are arranged so as to exert two predetermined forces on the stud perpendicularly to the surface of said stud, of the same intensity and of opposite directions, the points of application of the two forces being separated by a predetermined distance.

4. Optical device comprising at least one deformable mirror and a system for deforming said mirror according to claim 1, wherein four actuators are arranged so as to exert four predetermined forces on the stud perpendicularly to the surface of said stud, of predetermined intensity, the points of application of the forces being separated by a predetermined distance.

5. Optical device comprising at least one deformable mirror and a system for deforming said mirror according to claim 1, wherein the deformation system comprises a third structure comprising electromechanical means arranged so as to exert, at the ends of a first diameter of the surround of the mirror, two first predetermined forces perpendicularly to the reflecting face, of the same intensity and of the same direction.

6. Optical device comprising at least one deformable mirror and a system for deforming said mirror according to claim 5, wherein the electromechanical means are arranged so as to exert, at the ends of a second diameter of the surround of the mirror orthogonal to the first diameter, two second predetermined forces perpendicularly to the reflecting face, of the same intensity and of opposite directions to the first predetermined forces.

7. Optical device comprising at least one deformable mirror and a system for deforming said mirror according to claim 6, wherein the third structure comprises two deformable bars arranged orthogonally to one another and substantially parallel to the reflecting face, the first bar being attached to the surround of the mirror at the two ends of the first diameter and the second bar being attached to the surround of the mirror at the two ends of the second diameter, the electromechanical means being arranged so as to exert, at the intersection of the two bars, two opposing forces which tends to modify the distance which separates them in a dimension perpendicular to the reflecting face.

8. Optical device comprising at least one deformable mirror and a system for deforming said mirror according to claim 1, wherein the reflecting face of the deformable mirror is planar or spherical or aspherical not taking into account any deformation.

9. Method for producing a deformable mirror, wherein the production step of polishing said mirror is done on a tool comprising an optical device comprising said mirror and a system for deforming said mirror according to claim 1.

* * * * *